United States Patent [19]

Vander Mey

[11] 4,160,877
[45] Jul. 10, 1979

[54] MULTIPLEXING OF BYTES OF NON-UNIFORM LENGTH WITH END OF TIME SLOT INDICATOR

[75] Inventor: James E. Vander Mey, Newtonville, Mass.

[73] Assignee: Codex Corporation, Newton, Mass.

[21] Appl. No.: 775,419

[22] Filed: Mar. 7, 1977

Related U.S. Application Data

[63] Continuation of Ser. No. 702,921, Jul. 6, 1976, abandoned.

[51] Int. Cl.² .............................................. H04J 3/16
[52] U.S. Cl. ........................... 179/15 BA; 179/15 A; 179/15 BW
[58] Field of Search ....... 179/15 BA, 15 BW, 15 AL, 179/15 A, 15 BV; 340/172 SR

[56] References Cited

U.S. PATENT DOCUMENTS

| | | | |
|---|---|---|---|
| 3,016,527 | 1/1962 | Gilbert | 340/347 |
| 3,051,940 | 8/1962 | Fleckenstein | 340/347 |
| 3,597,549 | 8/1971 | Farmer | 179/15 AL |
| 3,603,739 | 9/1971 | Eoson | 179/15 AL |
| 3,982,077 | 9/1976 | Clark | 179/15 BA |

Primary Examiner—David L. Stewart

[57] ABSTRACT

A data transmission system is described wherein data in a plurality of constituent streams are received at a multiplexer, processed to form a single composite stream comprising time slots each carrying data from one constituent stream, transmitted in the composite stream over a communication link, and demultiplexed in a demultiplexer receiving the composite stream at the far end of the link to recover the original plurality of constituent streams in separate form. The system implements a protocol according to which a plurality of queues, each associated with one of the constituent streams and arranged and connected to receive and store data therefrom, are serviced by a sequence of time slots corresponding to a defined service sequence, the data in any one slot being derived from an associated queue, and being formed into codewords from a codeword set, with framing apparatus emitting terminator codewords to mark the ends of at least some slots.

16 Claims, 7 Drawing Figures

MULTIPLEXING OF BYTES OF NON-UNIFORM LENGTH WITH END OF TIME SLOT INDICATOR

This is a continuation of application Ser. No. 702,921, filed July 6, 1976, now abandoned.

BACKGROUND OF THE INVENTION

This invention relates to data multiplexing, that is, to forming a single composite data stream from a plurality of constituent data streams for sending over a transmission link, and to the recovery of the separate constituent streams on the other end of the link.

A typical situation employing multiplexing might be that of a bank branch where each of several tellers has his terminal and sends and receives information over a single telephone circuit connected to a terminal at the bank's central accounting facility. In such an arrangement the generation of data at or for any particular terminal may vary from instant to instant and its need for link capacity will correspondingly vary. In general the information capacity of the link will be greater than that of any single terminal but may not be greater than the aggregate of all terminals. Since in many systems the cost of the transmission link is expensive, it is important to multiplex efficiently taking account of the varying demand from the several terminals to achieve maximum benefit from the link's transmission capacity. It is also important to maintain the delay through the system at an acceptably short time.

The invention features in one aspect a multiplexer having therein a plurality of queues, each associated with one of several constituent data streams and arranged and connected to receive and store data therefrom, protocol-defining apparatus defining a service sequence for the queues, each queue appearing at least once in the sequence, and a codeword set, the elements thereof being bit sequences of non-uniform length, the set being uniquely parsable and including a terminator codeword used to designate the end of a slot, and framing means, communicating with the protocol-defining apparatus, and arranged and connected to emit a bit stream in a sequence of time slots corresponding to the defined service sequence, the data in any one slot being derived from its associated queue, and in the form of codewords from the codeword set, the framing apparatus emitting terminator codewords to mark the end of at least some slots.

In another aspect the invention features in a demultiplexer protocol-defining apparatus defining a service sequence for a plurality of constituent data streams, each constituent stream appearing at least once in the sequence, and a codeword set, the elements thereof being bit sequences of non-uniform length, the set being uniquely parsable and including a terminator codeword used to designate the end of a slot, parsing means, communicating with said protocol-defining apparatus, arranged and connected to parse and decode a composite stream of bits received from a transmission link in a sequence of time slots corresponding to said defined service sequence, the data in any one slot being derived from its associated constituent stream, and being in the form of codewords from said codeword set, and having terminator codewords marking the ends of at least some slots.

The invention additionally features in particular embodiments a single codeword set encoding together data characters and terminal control signal information from the constituent streams; a codeword set chosen to reflect the statistics of data frequency, with shorter codewords assigned to more frequent data; framing apparatus emitting in each successive slot all the data then stored in the associated queue plus a terminator codeword as the final codeword of each slot; protocol-defining apparatus additionally defining for each member of the service sequence a maximum codeword count and framing apparatus placing in each successive slot codewords corresponding to all the data then stored in the associated queue when the data then stored is less than that defined by the associated maximum codeword count followed by a terminator codeword, and otherwise an amount of data as defined by the maximum codeword count; a terminator codeword having a length of at least two bits; assignment of a maximum codeword count greater than 1 for at least one member of said service sequence.

A multiplexing system according to the invention achieves a high utilization of the link capacity together with short delay and flexibility in making the link capacity available to the terminals in response to their varying demands for service. It does this by defining a cyclical order of service for the terminals, the order being known at both the multiplexer and the demultiplexer. Both the multiplexer and the demultiplexer keep a record of the current status of the cycle, the receiver updating this record by reference to the incoming data. The demultiplexer can thus direct received data to the proper destination terminal by reference to the defined order together with the record of current status without requiring transmission of any identifying address. While the terminal service order is fixed, the amount of service to the several terminals, that is the amount of data sent, is permitted to vary in response to the changing demand at each terminal so that more of the link capacity is used to serve the more active terminals. Transitions in service from one terminal to the next in the cycle are indicated by transmission of a distinct terminator codeword. Alternatively, a maximum service during a service cycle for each terminal can be defined and the distinct terminator codeword transmitted only when (because of insufficient demand by the particular terminal) a transition is made after a lesser amount of service has been given.

DESCRIPTION OF EMBODIMENTS

Figure 1:
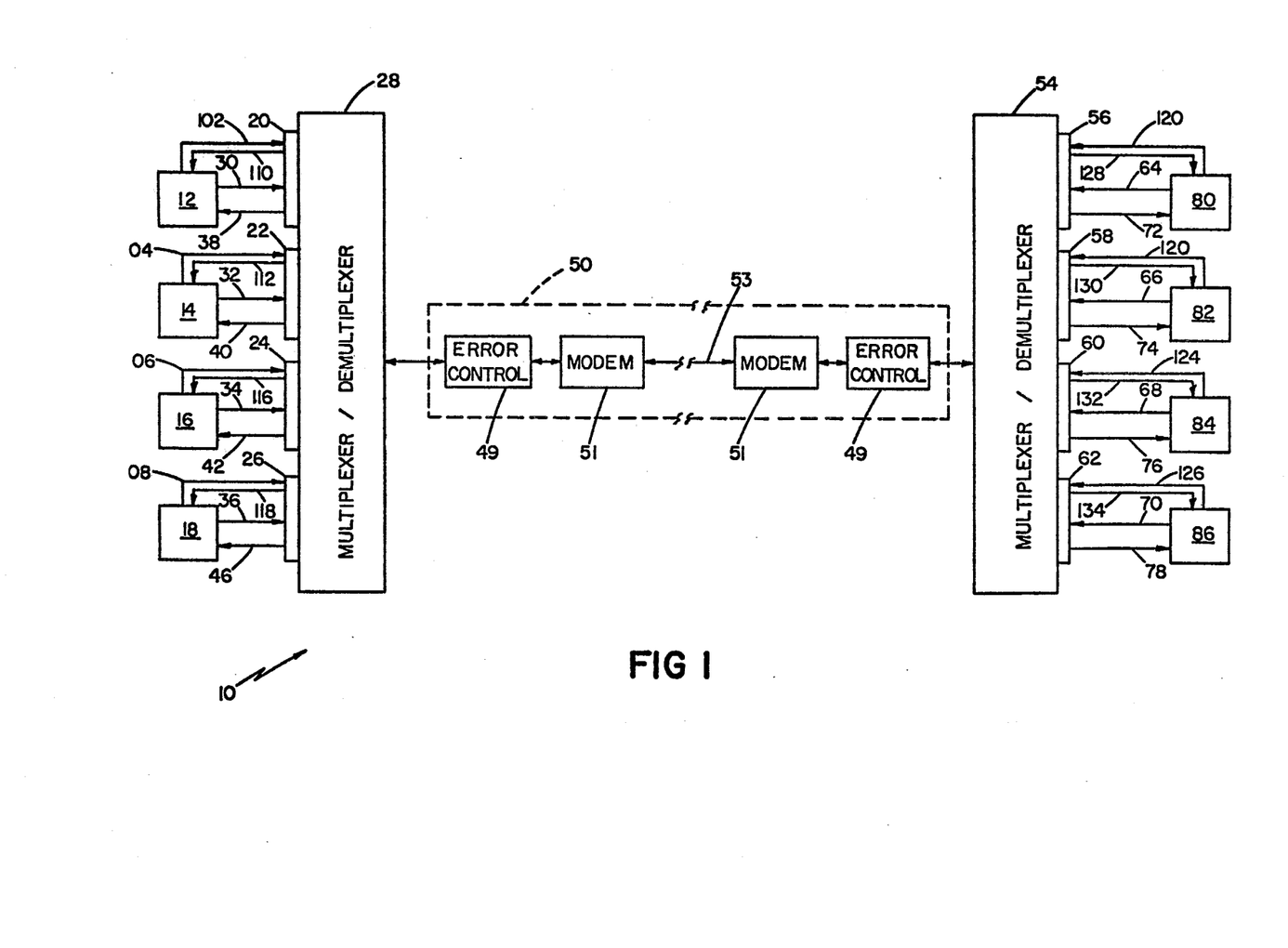
FIG. 1 shows a communication system employing the invention.

A communication system 10 employing the invention is shown schematically in FIG. 1. Terminals 12, 14, 16, 18 are connected respectively to terminal ports 20, 22, 24, 26, of multiplexer/demultiplexer 28 through data channels 30, 32, 34, 36, and data channels 38, 40, 42, 46. Terminal status channels 102, 104, 106, 108, from the terminals, and terminal control signal channels 110, 112, 116, 118, to the terminals, are also connected between respective terminals and ports. Multiplexer/demultiplexer 28 connects through link 50 to multiplexer/- demultiplexer 54, similar to multiplexer/demultiplexer 28, and similarly having terminal ports 56, 58, 60, and 62 connecting to data channels 64, 66, 68, 70, 72, 74, 76, and 78, in turn connecting to terminals 80, 82, 84, 86. Terminal channels 120, 122, 124, 126, 128, 130, 132, and 134 also connect respective ports and terminals. Link 50 may be a simple conductor pair or it may, as shown, include elements such as error control units 49 and modems 51 to adapt the transmitted signal to the transmission characteristics of the communication line according to circumstances. The error control units may use for example, the HDLC link protocol as specified by ISO (International Standards Organization).

The general flow of data through the system is as follows. Each of the several terminals emits on an irregular schedule a sequence of characters, which might for example be an inquiry as to the availability of funds in a particular account. The characters are coded as a sequence of binary digits physically represented as a sequence of high or low voltages sent on the terminal input channel. Multiplexer/demultiplexer 28 receives the several sequences of characters at its terminal ports 20, 22, 24, 26, and processes them (in a manner to be described hereafter) into a single sequence of binary digits (represented by alternative high and low voltages) which it emits onto link 50. This sequence of bits carries in composite format the data from all of the separate data streams entering on data channels 30, 32, 34, and 36, and status connectors 102, 104, 106, 108, in a form permitting recovery of the original data streams on the receiving end. Link 50 may include further apparatus for controlling transmission error, modulating and demodulating and the like, but whatever the intermediate apparatus, link 50 delivers the same sequence of bits to multiplexer/demultiplexer 54 that it received from multiplexer/demultiplexer 28. Multiplexer/demultiplexer 54 receives this sequence of bits, demultiplexes the composite data and delivers separate constituent streams of data from its output ports 56, 58, 60, 62 so that the data emitted on channel 72 is identical with that received on channel 30, the data emitted on channel 74 is identical with that received on channel 32, and so on through the other corresponding channels. It will be understood that at the same time data may be flowing in the opposite direction through the system.

Before taking up the details of the multiplexer/demultiplexer it will be helpful to consider the format of the data stream sent over the link. According to the invention, data is sent over the link in a sequence of non-uniform time intervals called "slots" which follow one another in a fixed cyclic order one such cycle being a "frame". Each of the slots of the frame is associated with one source terminal and carries data therefrom. Each terminal delivering data to the system has at least one slot associated therewith. An integral number, called a "maximum codeword count", is assigned to each slot of a frame. The maximum codeword count may be different for each slot, and may be advantageously chosen to reflect the relative transmission rate or priority of each terminal. In an important special but non-exceptional case all slots are assigned a maximum codeword count 1.

Each slot consists of a sequence of "codewords" derived from data supplied by its associated terminal. The codewords are bit sequences drawn from a set of distinct codewords called the "codeword set". The codeword set includes one element which is designated the "terminator codeword" or the "terminator", the use of which will be taken up below. The codeword set advantageously is non-uniform in bit length with shorter sequences corresponding to more frequently used codewords. In any case, the codeword set must have the property that it is parsable—that is to say that any sequence of codewords placed one after another to form a sequence of bits without explicit indication of the transition from one codeword to another can, nevertheless, be separated into its constituent codewords by analysis of the sequence of bits. A codeword set that is parsable is sometimes referred to as a uniquely decipherable code. In general, the analysis of a continuous sequence of bits to identify words, slots etc. will be referred to as "parsing". Particularly convenient parsable codes are the prefix code sets in which no element of the set is the prefix of any other element of the set. Sets with this property are used in the preferred embodiments and are discussed for example in D. A. Huffman: "A Method for the Construction of Minimum Redundancy Codes" Proc. IRE 50, p. 1098–1101 (September 1952).

In each slot are sent a number of codewords equal to the maximum word count assigned to the slot or a lesser number followed by the terminator. The end of a particular slot is thus identifiable either by finding a terminator or, in the absence of a terminator, when the number of codewords is equal to the assigned maximum codeword count for the slot.

Figure 2:
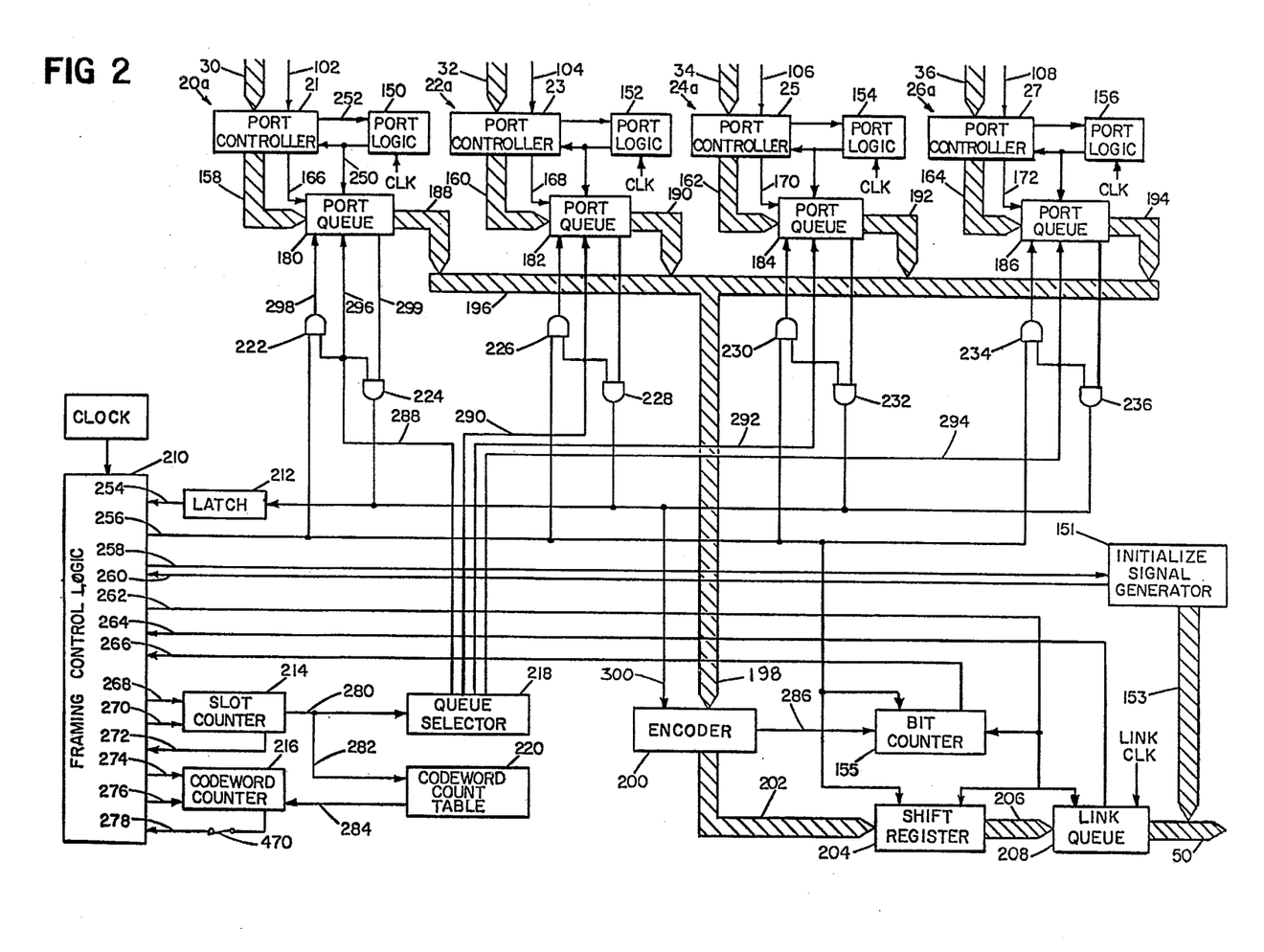
FIG. 2 shows a multiplexer embodying the invention and used in the system of FIG. 7.

Turning now to FIG. 2, there is shown the multiplexing section 28a of multiplexer/demultiplexer 28 (or equally 54) including the multiplexing sections 20a, 22a, 24a, and 26a of ports 20, 22, 24, and 26. Port controllers 21, 23, 25, and 27 are respectively connected to port queues 180, 182, 184, and 186 through 8-bit channels 158, 160, 162, and 164. (The term queue is used to mean specifically a storage device operating on the principle that the first data stored in is the first data read out.) One-bit control signal channels 166, 168, and 170, 172 also connect between the respective port controllers and port queues. Port logics 150, 152, 154, and 156 are connected to the corresponding port controls as shown. Port queues 180, 182, 184, 186 connect respectively on 9-bit channels 188, 190, 192, and 194 to bus 196, which in turn connects through 9-bit channel 198 to encoder 200. Encoder 200 connects over 16-bit channel 202 with shift register 206 and over 4-bit channel 286 to bit counter 155. Shift register 206 is connected through channel 206 to link transmitting queue 208. Slot counter 214 is connected through 2-bit channel 280 to queue selector 218 and over 2-bit channel 282 to codeword count table 220. Codeword count table 270 is connected over 4-bit channel 284 to codeword counter 216. Initialize signal generator 151 is connected by channel 153 with link 50. Framing control logic 210, latch 212, bit counter 155 and AND gates 222, 224, 226, 228, 230, 232, 234, 236 and additional connections are as shown in FIG. 2. Master clock inputs are connected as shown.

Figure 3:
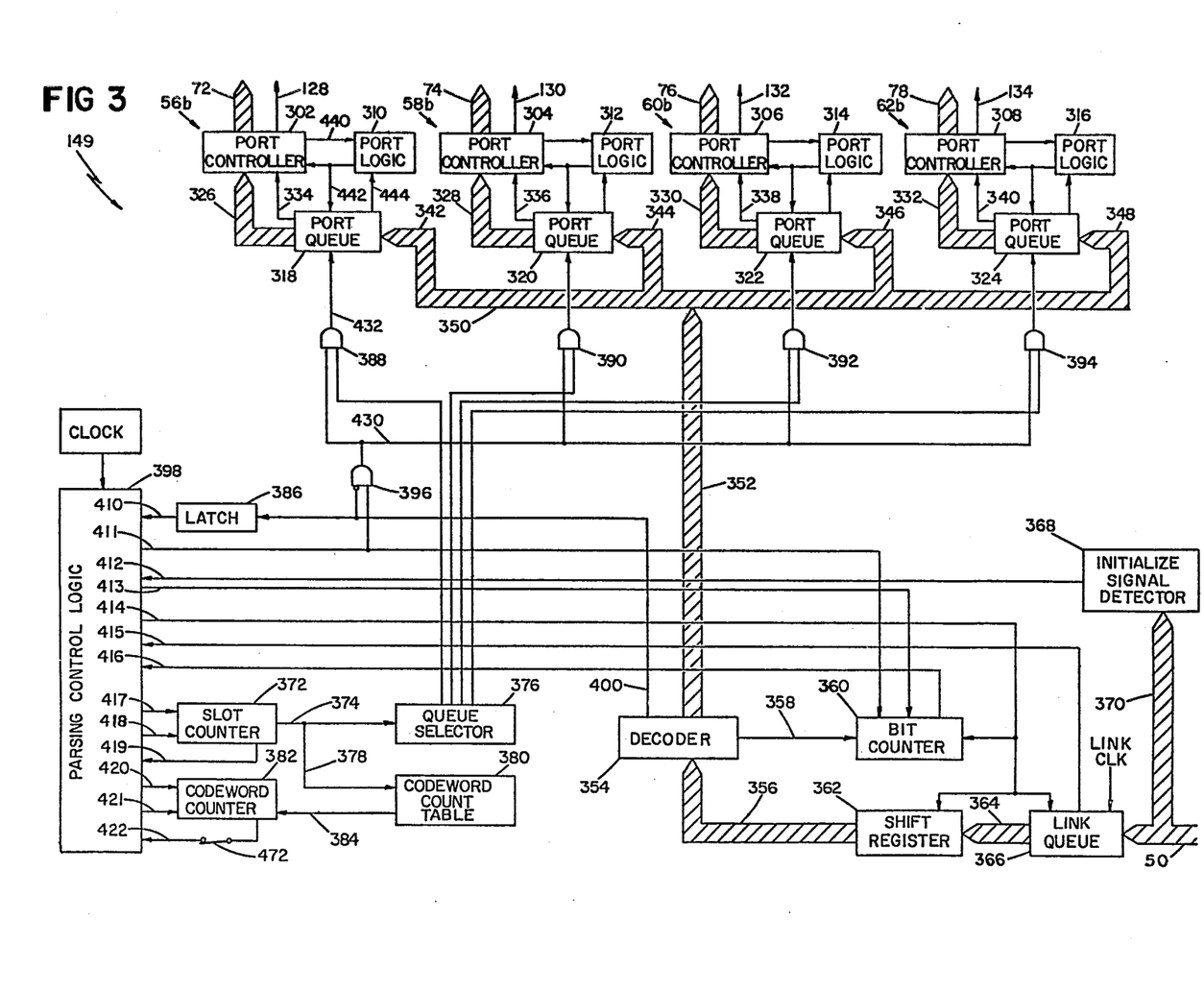
FIG. 3 shows a demultiplexer embodying the invention and communicating with the multiplexer of FIG. 2.

Turning now to FIG. 3, there is shown the demultiplexing portion of multiplexer/demultiplexer 54 (or equally of 28, but it is the demultiplexer of 54 that cooperates with the multiplexer of 28). The demultiplexer includes demultiplexing sections 56b, 58b, 60b, and 62b of terminal ports 50, 56, 58, 60, and 62 respectively. Port controllers 302, 304, 306, and 308 are connected to emit data outputs on channels 72, 74, 76, and 78 respectively and control signal outputs on channels 128, 130, 132, and 134 respectively. Port controller 302 is connected to port queue 318 through 8-bit channel 26 and singlebit channel 334, with similar connections between port controller 304 and port queue 320, between port controller 306 and port queue 322 and between port control 308 and port queue 324, as shown in the figure. Port logic 310 is connected as shown to port controller 302 and port queue 318 and port logics 312, 314, and 316 are similarly connected in the corresponding ports. Port queues 318, 320, 322, and 324 are connected respectively through 9-bit channel 342, 344, 346, and 348 to 9-bit bus 350 which is in turn connected through 9-bit channel 352 to decoder 354. Decoder 354 is connected by 16-bit channel 356 to shift register 362 and by 4-bit channel 358 to bit counter 360. Shift register 362 is connected through channel 364 to link queue 366 which is connected to link 50. Initialize signal detector 368 is connected through channel 370 also to link 50. Slot counter 372 is connected through 2-bit channel 374 to queue selector 376 and by 2-bit channel 378 to codeword count table 380. Codeword counter 382 is connected through 4-bit channel 384 to count table 380. Parsing control logic 398, latch 386, AND gates 396, 388, 390, 392, and 394 are connected as shown in FIG. 3.

The port controllers 21, 23, 25, 27, 302, 304, 306, and 308 can be implemented with commercially available components such as part No. UC 1671 B, manufactured by Western Digital Corporation.

The port queues 180, etc. and 302, etc. are commercially available components. In particular part No. 8X07, manufactured by Signetics Corporation, may be used for the port queues. Link queues 208 and 366 are available as a standard component. In particular part No. AMD2812, manufactured by Advanced Micro Devices Incorporated is suitable for the link queues. Encoder 200 is a conventional read-only-memory with 10-bit address and 20-bit output. Queue selectors 218 and 376 may be conventional 2 to 4 selector. These selectors as well as the latches, counters, shift registers and AND gates are standard items of commerce well-known and readily available to those skilled in the art.

The multiplexing control logic 210, multiplexing port logic 20, etc., parsing control logic 398, demultiplexing port logic 310, etc. are simple finite state machines which assert various signals by emitting pulses on state transition. The design and construction of each of the logics will be readily accomplished by those skilled in the art from the state diagrams and tables given herein. A description of the design procedures is given by standard texts such as M. Morris Mano: *Computer Logic Design,* Prentice Hall, 1972.

Since data multiplexing according to the invention employs implicit addressing of data, mutual basis or protocol for this addressing must be established between communicating multiplexers/demultiplexers before data transmission begins. Accordingly, prior to the start of data transmission, information defining the number of slots in a frame, the identification of the terminal associated with each slot, the maximum codeword count assigned to each slot, and the codeword set must be entered in protocol-defining apparatus at both of the multiplexers/demultiplexers 28 and 54.

The number of slots in a frame is entered as the reset value for slot counters 214 and 372.

The identification of terminals associated with slots is established by the internal switching logic of queue selectors 218 and 376. These selectors operate by maintaining one of four output terminals at a high voltage, the selected output being determined by a 2-bit input representing the slot index number. The high terminal is then used to enable the associated one of the four queues.

The maximum codeword count assignment is entered in the memory of codeword count tables 220 and 380. These operate by accepting a 2-bit address representing the slot index number and emitting a 4-bit output representing the maximum codeword count assigned to that slot.

The information defining the codeword set is entered into encoder 200 and decoder 354. In the embodiment of FIGS. 2 and 3 a prefix code set with variable length codewords up to 16 bits is used, one codeword being defined as the terminator and other codewords defined to correspond to each of the characters used by the terminals and further codewords defined to correspond to each of the control signals used by the terminals.

A simple example of a prefix codeword set of non-uniform length is as follows: (0; 10; 110; 1110). It is clear that no element of this code set is a prefix of any other and accordingly that it can be parsed. The codeword 10 might be designated the terminator and the other codewords identified with characters used by the terminals. Another simple example is the set (1: 0000000000; 0000000001; 0000000010; . . . ; 0XXXXXXXXX; . . . 0111111111) where the simple 1 might be designated the terminator and all the other codewords have 10 bits starting with a 0 and continuing with 9 bits in any sequence. Again it is plain that no element is a prefix of another since the terminator is a 1 and cannot be the prefix of any others which all start with a 0, and no 10 bit element can be a prefix of another 10-bit element. There are of course many prefix codeword sets, and the codeword set is advantageously constructed to reflect the frequency of character use, shorter codewords being assigned to more frequently used characters.

Encoder 200 is loaded with reference to the defined codeword set in a way to facilitate the encoding of terminal characters into codewords. The correspondence of the characters and control signals used by the terminals on the one hand, and the codeword set on the other, is established by the structure of the encoder 200 where the characters are used as address input and the codewords are the corresponding output. More particularly the address input to encoder 200 consists of 10 bits, nine of which represent the characters and control signals from the connected terminal and the tenth indicating when the connected port queue is empty. The 20-bit output is divided into a 16-bit portion giving the associated codeword followed by zeros or anything to fill out the unused bit positions, and a 4-bit portion giving explicitly the number of bits in the codeword. For example if the appropriate codeword were 1110 the output from the encoder would be 11100000000000000100.

It may be noted that the entries in the encoder memory are such that all addresses of the type 1XXXXXXXXX produce the designated terminator codeword. This means that whenever a 1 is asserted on channel 284, encoder 200 will present the terminator at its output.

Decoder 354 is loaded with reference to the same defined codeword set but is arranged to facilitate the decoding process translating codewords into terminal characters. The address input to the decoder has 16 bits corresponding to the maximum length codeword that is used in the embodiment. The memory entries in the decoder are such that when a codeword not the terminator starts the 16-bit address the decoder will output the corresponding character on 9-bit channel 352, a 0 on channel 400 and the number of bits in the codeword on 4-bit channel 358. For example, if 11110 is a codeword all addresses of the form 11110XXXXXXXXXXX (where X=either 0 or 1) would produce an output of 0100 on 4-bit channel 358 indicating that the codeword has 5 bits (assuming that 0000 indicates a one-bit codeword), a 0 on channel 400 indicating that the codeword is not the terminator, and a 9-bit output on channel 352 giving the character corresponding to the codeword. If the terminator codeword (which we assume now to be a single 0) is the first part of the 16-bit input (i.e. 0XXXXXXXXXXXXXXX) the decoder will output 0000 on channel 358 indicating a one-bit codeword, a 1 on channel 400 indicating the terminator, and 9 arbitrary bits on channel 352.

The operation of the multiplexer/demultiplexer may conveniently be divided into the operation of several sections each going forward under control of its own logic. The various components that change state such as latches, registers and queues do so in response to pulses generated by the relevant control logic. Since every control logic is synchronized by a master clock, all state changes in the multiplexer/demultiplexer are synchronous.

Figure 4:
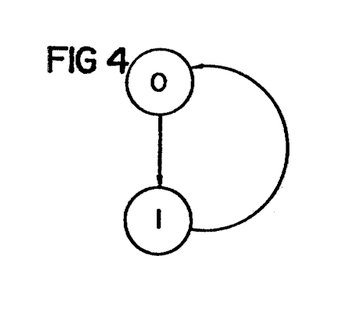
FIGS. 4, 5, 6, and 7 show state diagrams of logic devices employed in the multiplexer and demultiplexer of FIGS. 2 and 3.

The first operation to be described will be that controlled by port logic 150 in the multiplexing section. Since the four sections are alike it will be sufficient to describe section 20a shown in FIG. 2. This section includes port controller 21 and the input to port queue 180, and is controlled by port logic 150. Logic 150 has two states, denominated 0 and 1. Its state diagram is shown in FIG. 4 and its logic table is shown in the following table:

| | LOGIC 150 | | |
|---|---|---|---|
| Current State | Channel Pulsed on Entering State | Input Required For Transition | Next State |
| 0 | — | channel 252 | 1 |
| 1 | 250 | none | 0 |

The detailed operation controlled by port logic 150 is as follows.

Data are received by port controller 21 from the corresponding data source on channel 30. The data arriving at the port controller are in bit serial form. The data bits are typically formatted in characters according to one of the standard communications protocols—for example, a start/stop asynchronous protocol or a character-oriented synchronous protocol such as IBM's binary synchronous communications protocol. Control signals indicating the status of attached terminals or modems or other devices are also received by port controller 21 on channel 102.

The port controller 21 functions to transform the bit sequence into 8-bit parallel form. When port controller has fully received a character it indicates that it has this character in parallel form by asserting a "data available" signal on channel 252. It also at this time presents the 8 bits of the character on 8-bit channel 158 and a 0 on channel 166.

The "data available" signal on channel 252 is received by port logic 150 which is assumed to be in state 0. At the next clock pulse the logic shifts to state 1 and emits an "accept data" signal on channel 250. The pulse on channel 250 loads queue 180 with 9 bits—8 from channel 158 and 1 from channel 166—and conditions port controller 21 for readying a new character. At the next clock pulse, logic 150 transfers to state 0. And so on cyclically.

The port controller also transfers control signal information. When a control signal changes, a character will be asserted together with a 1 on channel 166. It other respects the operation is as before described. It may be noted that from the viewpoint of the queue, a sequence of 9-bit characters are received with no formal distinction between data characters and control signal information.

The next section to be described will be that controlled by framing control logic 210 which controls the taking of data from the several queues 180, 182, 184, 186, the encoding of this data into the codeword set, and the entering of the codewords into queue 208 as required by the protocol described. Queue 180 (representative also of queues 182, 184, and 186) has two types of output states, an "off" or high impedance state when the slot select channel 296 is not asserted, and the normal binary state representing the oldest stored character when the slot select channel 296 is asserted. Queue 180 also has an "unload" input terminal connected to channel 298 which discharges the oldest character (i.e. 9 bits) from the queue and a terminal connected to channel 299 indicating (with a high or 1) when the queue is empty. As described above queue selector 218 at all times maintains one of its output channels 288, 290, 292, or 294 high (i.e. 1) the particular channel being determined by the queue selector input on channel 280. The high output—say channel 288—enables the corresponding queue 180 on channel 296 and also enables the unload input through AND gate 222 and the empty indicator through AND gate 224. In the meantime all other queues (i.e. 182, 184, 186) are disconnected.

The enabled queue 180 will present the oldest stored character to the on channel 198, or if empty, the empty signal on channel 300. The empty signal is also presented to latch 212.

Figure 5:
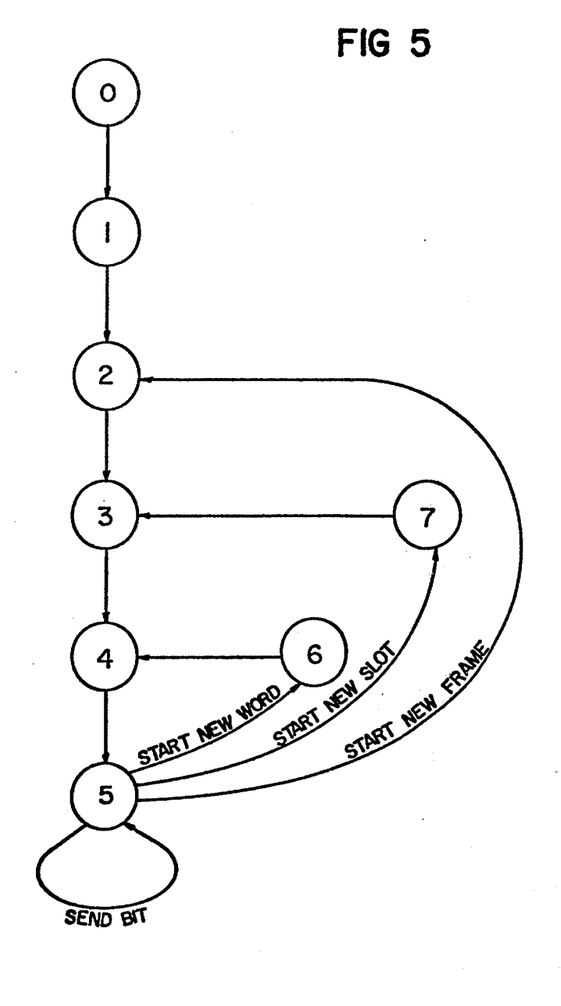

Logic 210 has eight states. Its state diagram is shown in FIG. 5 and its state table is given below.

| | | LOGIC 210 | | | | | | |
|---|---|---|---|---|---|---|---|---|
| State | Channel Output on Entering State | | Signal Required For Transition By Channel | | | | | Next State |
| | | | 260 | 264 | 266 | 254 | 278 | 272 | |
| 0 | 258 | | X | X | X | X | X | X | 1 |
| 1 | — | | 1 | X | X | X | X | X | 2 |
| 2 | 268 | | X | X | X | X | X | X | 3 |
| 3 | 274 | | X | X | X | X | X | X | 4 |
| 4 | 256 | | X | 1 | X | X | X | X | 5 |
| 5 | 262 | (a) | X | 1 | 0 | X | X | X | 5 |
| | | (b) | X | X | 1 | 0 | 0 | X | 6 |
| | | (c) | X | X | 1 | 1 | X | 1 | 2 |

-continued

| | | | | LOGIC 210 | | | | | | |
|---|---|---|---|---|---|---|---|---|---|---|
| State | Channel Output on Entering State | | | Signal Required For Transition By Channel | | | | | | Next State |
| | | (d) | X | X | 1 | X | 1 | 1 | | 2 |
| | | (e) | X | X | 1 | 1 | X | 0 | | 7 |
| | | (f) | X | X | 1 | X | 1 | 0 | | 7 |
| 6 | 276 | | X | X | X | X | X | X | | 4 |
| 7 | 270 | | X | X | X | X | X | X | | 3 |

(Note: X means either 0 or 1)

At start up, logic 210 is switched into state 0 and emits an "initialize" output on channel 258. This activates initialize signal generator 151 to send a synchronization sequence to the connected demultiplexer. On the next clock, logic 210 transfers to state 1 where it stays until it gets an assertion of "completion of the initialization operation" from generator 151 on channel 260. Then on the next clock it transfers to state 2 emitting a "set slot count" pulse on channel 268 which sets slot counter 214 to its starting value which is equal to the number of slots in a frame cycle. This has the effect of starting a new frame. Queue selector 218 receiving an input from slot counter 214 indicating a slot index will enable the corresponding queue as described; and codeword count table 220 receiving the same index will present the maximum codeword count assigned to that slot on channel 284. On the next clock, logic 210 shifts to state 3 and emits on channel 274. This loads the codeword counter with the value presented on channel 284 from the codeword count table. On the next clock, logic 210 shifts to state 4 and emits on channel 256. This unloads a character from queue 180 and loads shift register 204 with the codeword presented on channel 202. It should be noted that this input is formatted so that the leading bit of the codeword is placed first, followed by the remaining bits of the codeword, and then the bits which fill out the remainder of the 16-bit input. At the same time the 4-bit indication of the length of the codeword is loaded in bit counter 155, and latch 212 is loaded.

Logic 210 requires an assertion "queue ready" from link queue 208 before exiting from state 4. When it has this, it shifts on the next clock to state 5, emitting on channel 262. This acts on shift register 204 and link queue 208 to effect transfer of 1 bit from the register to the queue. The asserted signal also acts to decrement bit counter 155.

The exit of logic from state 5 depends on conditions a to f as shown in the state table above. These will be described in the order they occur in the table.

If the "output bit count equals zero" signal is not asserted on 266 and the "queue-ready" signal is asserted on 264 (condition a), at a clock transition the link transmit control logic will again transition to state 5 and assert again the "output data bit" signal on 262.

If the "output bit count equals zero" signal is asserted on 266, a "terminator" signal is not asserted on 254 and a "codeword count equals zero" signal is not asserted on 278 (condition b), the link transmit control logic will transition to state 6 on the next clock cycle.

If the "output bit count equals zero" signal is asserted on 266, and also the "slot count=0" signal on 272, and either the "codeword count equals zero" signal is asserted on 278 or the "terminator" signal is asserted on 254 the next state transition will be to state 2. These conditions are indicated as c and d. If the "output bit count equals zero" is asserted on 266, the "slot count=0" is non-asserted on 272, and either "codeword count=0" on 278 or "terminator" on 254 is asserted, logic transfers to state 7 on the next clock. These are conditions e and f.

A transition to state 6 will result in asserting the "decrement codeword count" signal on 276. This signal causes the codeword counter to decrement by 1. A transition to state 4 will occur on the next clock cycle.

A transition to state 7 results in assertion of the "decrement slot count" signal on 270. This results in decrementing the slot counter which results in selecting a new port section and maximum codeword count for that slot as previously discussed. At the next clock cycle the link transmit control logic will transition to state 3.

Figure 6:
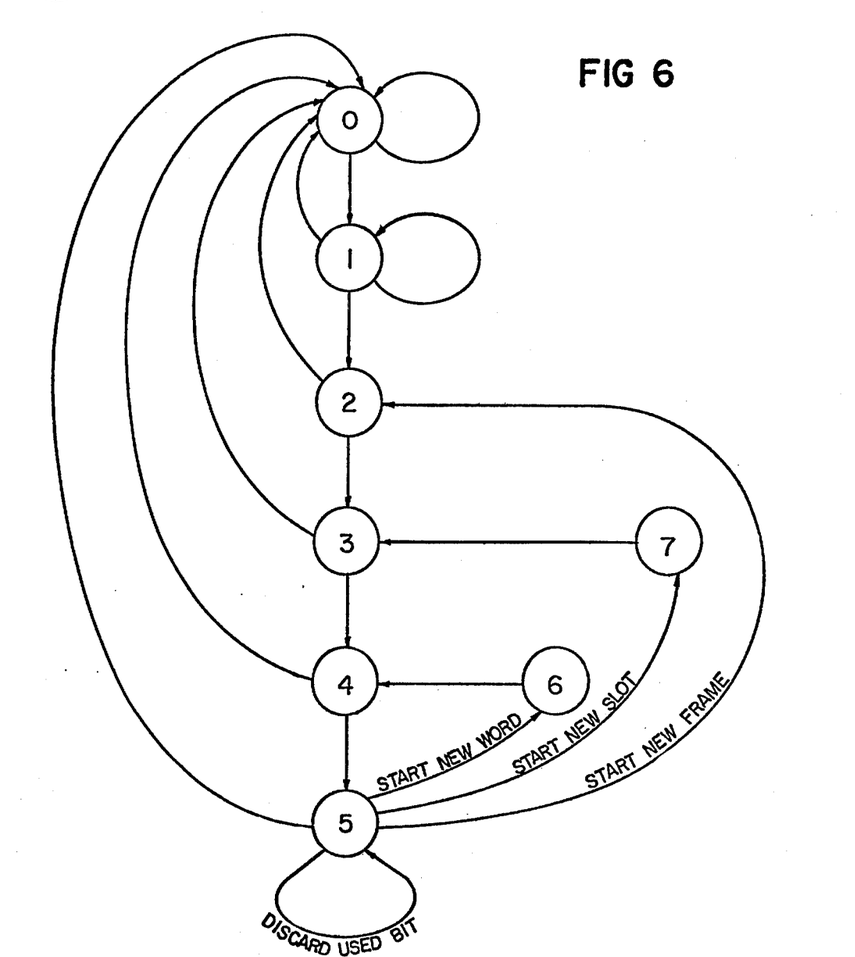

We turn now to the operation of demultiplexer section of multiplexer/demultiplexer 54 shown in FIG. 3. In general terms, the function of the demultiplexer is firstly to parse the data stream incoming on link 50 into slots and codewords, translate the codewords into the characters used by the terminals and distribute the characters to the appropriate port queues. This much of the operation is controlled by parsing control logic 398. Logic 398 is a finite state machine. Its state diagram is shown in FIG. 6 and the link receive logic state table is given below.

| | | | | | LOGIC 398 | | | | | | |
|---|---|---|---|---|---|---|---|---|---|---|---|
| State | Output Channel | Output Function | | | | Input required for transfer | | | | | Next State |
| | | | | | 412 | 415 | 416 | 410 | 422 | 419 | |
| 0 | 413 | Clear input bit count | (a) | | 0 | 1 | X | X | X | X | 1 |
| | | | (b) | | 1 | X | X | X | X | X | 0 |
| 1 | 414 | Input data bit | (a) | | 0 | 1 | 0 | X | X | X | 1 |
| | | | (b) | | 0 | X | 1 | X | X | X | 2 |
| | | | (c) | | 1 | X | X | X | X | X | 0 |
| 2 | 417 | Reset frame | (a) | | 0 | X | X | X | X | X | 3 |
| | | | (b) | | 1 | X | X | X | X | X | 0 |
| 3 | 420 | Load codeword count | (a) | | 0 | X | X | X | X | X | 4 |
| | | | (b) | | 1 | X | X | X | X | X | 0 |
| 4 | 411 | Load input codeword | (a) | | 0 | X | X | X | X | X | 5 |

-continued
LOGIC 398

| State | Output Channel | Output Function | | Input required for transfer | | | | | | Next State |
|---|---|---|---|---|---|---|---|---|---|---|
| 5 | 414 | Input data bit | (b) | 1 | X | X | X | X | X | 0 |
|   |     |                | (a) | 0 | 1 | 0 | X | X | X | 5 |
|   |     |                | (b) | 0 | X | 1 | 0 | 0 | X | 6 |
|   |     |                | (c) | 0 | X | 1 | 1 | X | 1 | 2 |
|   |     |                | (d) | 0 | X | 1 | X | 1 | 1 | 2 |
|   |     |                | (e) | 0 | X | 1 | 1 | X | 0 | 7 |
|   |     |                | (f) | 0 | X | 1 | X | 1 | 0 | 7 |
|   |     |                | (g) | 1 | X | X | X | X | X | 0 |
| 6 | 421 | Decrement codeword count | (a) | 0 | X | X | X | X | X | 4 |
|   |     |                | (b) | 1 | X | X | X | X | X | 0 |
| 7 | 418 | Decrement slot count | (a) | 0 | X | X | X | X | X | 3 |
|   |     |                | (b) | 1 | X | X | X | X | X | 0 |

At the beginning of a transmission, the demultiplexer must be put in a state corresponding to the start of a frame of the message it is to recieve. This is accomplished when initialize signal detector 368 recognizes the synchronization sequence transmission received on link 50 from the sending multiplexer. When such a sequence is recognized by the initialize signal detector it will assert the "initialize" signal on channel 412. As can be seen in the logic table, irrespective of which state the parsing logic 398 is currently in, it will transition to state zero on the next clock cycle whenever the "initialize" signal is received. Thus the multiplexer can force the demultiplexer into the appropriate state, namely state 0. Data then present in the receive queue 366 is data that immediately follows the initialized sequence from the transmitter, and corresponds to the beginning of a transmit frame.

When control logic 398 transfers to state zero it emits the "clear input bit count" signal on channel 413. This signal clears bit counter 360. If the "initialize" signal is not asserted on channel 412 and the "queue data available" signal is asserted on 415, a transition to state 1 will occur on the next clock cycle.

On the transition to state 1 the "input data bit" signal will be asserted on channel 414. This signal will shift one bit from the link receive queue to the receive shift register and decrement the receive bit counter. If on the next clock cycle the "queue data available" signal is asserted on 415 and the "input bit count equals zero" signal is not asserted on 416, logic 398 will again transition to state 1. This corresponds to condition 1a. If the "input bit count equals zero" signal is asserted on 416, on the next clock cycle a transition to state 2 will be made. This corresponds to condition 1b in the logic table, and indicates that shift register 362 is full, having shifted in 16 bits from the queue 366.

Transferring to state 2 results in the "load slot counter" signal being asserted on 417. This signal enters the defined number of slots in a frame in counter 372 and selects the first slot of the frame. The queue select channel corresponding to the first slot of the frame is asserted from the queue selector. This signal goes to the port section designated by the protocol to receive the first slot. This signal goes to an AND gate associated with the designated queue (say 318) and enables it to receive signals from bus 430. On the next clock cycle logic transfers to state 3.

Transferring to state 3 causes the "load codework count" signal to be asserted on 420. This signal loads the codeword counter 382 with the maximum codeword count supplied by the codeword count table 380 for the currently indexed slot. On the next clock, logic 398 transfers to state 4. A transition to state 4 causes the "load input codeword" signal to be asserted on 411. The 14-bit output from the decoder 354 corresponding to the 16-bit input from the shift register is presented—one bit to channel 400 indicating whether the input codeword is a terminator, 4 bits to the bit counter indicating the length of the codeword—and 9 bits to the selected port queue over bus 350. The corresponding data output from decoder 354 is presented, (1) as a data word on the common data bus, (2) as length output to the receive bit counter, and (3) a bit indicating whether or not the data word is a terminator word to a latch. This "load input codeword" signal therefore loads the codeword length count to bit counter 360, the terminator indicator bit to latch 386, and if the terminator bit is 0, loads the data from the common data bus to the selected port queue by applying a load signal to the queue on channel 432. It may be noted that the effect of gate 396 is to prevent loading of the port queue when a terminator is presented to decoder 354. On the next clock cycle logic 398 transfers to state 5.

Transfer to state 5 results in asserting the "input data bit" signal on 414. This signal shifts a bit from link queue 366 to shift register 362, and decrements the bit counter 360. Excluding the initialization state, transition from state 5 can be to one of four states as indicated. The condition for these transitions will be described in the order listed in this figure. If the "input bit count equals zero" signal is not asserted on 416 and the "queue data available" signal is asserted on 415 a transfer to state 5 will be made on next clock cycle. This results in again asserting the "input data bit" signal as previously described. If the "input bit count equals zero" signal is asserted on 416 and the "terminator word" is not asserted on 410 and the "codeword count equals zero" signal is not asserted on 422 a transition to state 6 will be made on the next clock cycle. This corresponds to condition 5b. A transition to state 2 will occur if the "input bit count equals zero" signal is asserted on 416 and the "slot count=0" signal is asserted on 419 and either the "terminator word" on 410 or the "codeword count equals zero" on 422 is asserted. This corresponds to conditions 5c and 5d. Transition to state 7 occurs when the "input bit count equals zero" signal is asserted on 416, the "slot count=0 " signal is not asserted on 419 and either the "terminator word" on 410 or the "codeword count equals zero" on 422 is asserted. This corresponds to conditions 5e and 5f.

A transition to state 6 results in asserting the "decrement codeword count" signal on 421. This signal decrements the codeword counter 382. On the next clock cycle the transition is made to state 4.

Transfer to state 7 results in asserting the "increment slot count" signal on 418. The slot address counter is incremented which results in selecting a new port queue and a new maximum word count from the counter selector 380. A transition is made on the next clock cycle to state 3.

Figure 7:
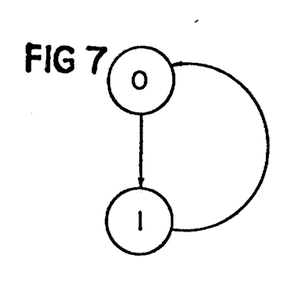

Turning now to the operations controlled by port logic 310 (and in similar manner by the other port logics), the state diagram for logic 310 is shown in FIG. 7, and the state table is as follows:

| State | Signal on Entering State | Input Required for Transfer | Next State |
|---|---|---|---|
| 0 | — | — | 1 |
| 1 | channel 442 | 1 on 440 and 0 on 444 | 0 |

When the port logic is in state 0, it will transition to state 1 when the port controller's "ready for data" signal is asserted on 440 and the "queue empty" signal is not asserted on 444. Transition to state 1 will result in the assertion of the "transfer data" signal on 442 which will load data from the queue into the port controller. The port controller will remove its "ready for data" signal until it is ready for more data. The port transmit control logic will transfer to state 0 on the next clock cycle.

The operation of the system can be summarized with particular reference to FIGS. 5 and 6. The multiplexer passes through a sequence of states as displayed in FIG. 5, while the demultiplexer follows a similar sequence shown in FIG. 6. Each sequence has branch points. It is necessary to have the multiplexer and the demultiplexer make the same decisions at each branch point. Most of these decisions, however, are coordinated by reference to the equivalent protocol-defining apparatus provided at each of the multiplexer and demultiplexer and so require no transmission over the link. Only the minimum data to indicate the allocation of link time to the various operating terminals in accordance with demand (represented by the terminator transmissions) are transmitted over the link.

The embodiment described above implements a protocol in which a maximum codeword count is assigned to each slot and transfer to a new slot occurs when either (a) the number of codewords sent in a slot equals this count or (b) when the port queue assigned to the slot is empty. In the latter case only a terminator codeword is sent to mark the end of the slot.

In some situations it is more advantageous to adopt a protocol in which each slot is continued until its associated port queue has been emptied and in which a terminator is invariably sent as the final codeword marking the end of each slot. The described embodiment can be converted to operate on the latter protocol by opening both switch 470 in channel 278 and switch 472 in channel 422. It may be noted that condition 5d and 5f of the state tables of logics 210 and 398 then never occur. If the latter protocol is to be used exclusively the codeword counters 216, 382 and codeword count tables 220, 380 can be dispensed with.

Many alternatives to this particular embodiments are of course possible. For example the order, number and placement of the various elements could be different. As an example, separate encoders and decoders could be placed between the port queues and the common data bus. This would provide the ability for each data stream to have its own, possibly different, code set. The encoder/decoders could also be placed between the queues and port controllers in the various port sections. The queues would then contain the codeword form of the data.

Additional elements could be added to increase the generality of this embodiment. For example, a table to map the slot counter address values to the port section addresses could be included between the slot counter and the queue selector elements. This would result in allowing the sequencing of port service in an arbitrary manner within a frame.

It will be obvious to one proficient in the state of the art that the implementation of the various elements could be done many ways. For example the use of ROM's as encoders and decoders could be replaced with programmed logic arrays to reduce the physical table size in some circumstances, or by read-write memories to allow dynamic changes to these tables.

The invention can also be embodied in a functionally equivalent computing system using the computer memory for the protocol-defining tables and queues, input-/output controllers connected to the computer for the port controllers and shift registers and implementing the functions of the several logic machines with a suitable computer program.

What is claimed is:

1. For use in a data transmission system wherein data in a plurality of constituent streams are received at a multiplexer, processed to form a single composite stream comprising time slots each carrying data from one constituent stream, transmitted in said composite stream over a communication link, and demultiplexed in a demutiplexer receiving said composite stream to recover the original plurality of constituent streams in separate form, the improvement comprising the combination of a plurality of queues in said mulitplexer, each associated with one of said constituent streams and arranged and connected to receive and store data therefrom, protocol-defining apparatus in said multiplexer defining a service sequence for said queues, each queue appearing at least once in said sequence, and a codeword set, the elements thereof being bit sequences of non-uniform length, said set being uniquely parsable and including a terminator codeword used to designate the end of a slot, framing means in said multiplexer, communicating with said protocol-defining apparatus therein, and arranged and connected to emit a bit stream in a sequence of time slots corresponding to said defined service sequence, the data in any one slot being derived from its associated queue, and in the form of codewords from said codeword set, said framing means emitting terminator codewords to mark the ends of at least some slots, said bit stream being suitable for transmission over the link to a demultiplexer parsing and decoding and composite stream of bits received from said link, and emitting in separate form the original plurality of constituent data streams.

2. Apparatus as claimed in claim 1 wherein the data in at least one of said constituent streams includes both data characters and terminal control signal information, and wherein a single codeword set is used to encode together said characters and said control signal information.

3. Apparatus as claimed in claim 1, said codeword set being chosen to reflect the statistics of data frequency, with shorter codewords assigned to more frequent data, thereby reducing required link capacity.

4. Apparatus as claimed in claim 1, said framing apparatus emitting in each successive slot all the data then stored in the associated queue plus a terminator codeword as the final codeword of each slot.

5. Apparatus as claimed in claim 1, wherein said protocol-defining apparatus additionally defines for each member of said service sequence a maximum codeword count and said framing apparatus places in each successive slot codewords corresponding to all the data then stored in the associated queue followed by a terminator codeword when the number of such codewords is less than the associated maximum codeword count, and otherwise a number of codewords equal to the maximum codeword count.

6. Apparatus as claimed in claim 1, said terminator codeword having a length of at least two bits.

7. Apparatus as claimed in claim 5, wherein the maximum codeword count for at least one member of said service sequence is greater than 1.

8. In a data transmission system wherein data in a plurality of constituent streams are received at a multiplexer, processed to form a single composite stream comprising time slots each carrying data from one constituent stream, transmitted in said composite stream over a communication link, and demultiplexed in a demultiplexer receiving said composite stream at the far end of said link to recover the original plurality of constituent streams in separate form, the improvement comprising in combination
a plurality of queues in said multiplexer, each associated with one of said constituent streams and arranged and connected to receive and store data therefrom,
first protocol-defining apparatus in said multiplexer and second protocol-defining apparatus in said demultiplexer each defining a service sequence for said queues, each queue appearing at least once in said sequence, and a codeword set, the elements thereof being bit sequences of non-uniform length, said set being uniquely parsable and including a terminator codeword used to designate the end of a slot,
framing means in said multiplexer, communicating with said protocol-defining apparatus therein, and arranged and connected to emit a bit stream for transmission on said link in a sequence of time slots corresponding to said defined service sequence, the data in any one slot being derived from its associated queue, and in the form of codewords from said codeword set, said framing means emitting terminator codewords to mark the ends of at least some slots, and
parsing means in said demultiplexer, communicating with said second protocol-defining apparatus, arranged and connected to parse and decode the composite stream of bits received from said link and to emit in separate form the original plurality of constituent data streams.

9. Apparatus as claimed in claim 1, said codeword set being a variable length prefix code set no element of which is a prefix of any other element therein.

10. In a data transmission system wherein data in a plurality of constituent streams are received at a multiplexer, processed to form a single composite stream comprising time slots each carrying data from one constituent stream, transmitted in said composite stream over a communication link, and demultiplexed in a demultiplexer receiving said composite stream at the far end of said link to recover the original plurality of constituent streams in separate form, the improvement comprising in combination in said demultiplexer
protocol-defining apparatus in said demultiplexer defining a service sequence for said constituent streams, each constituent stream appearing at least once in said sequence, and a codeword set, the elements thereof being bit sequences of non-uniform length, said set being uniquely parsable and including a terminator codeword used to designate the end of a slot,
parsing means in said demultiplexer, communicating with said protocol-defining apparatus, arranged and connected to parse and decode a composite stream of bits received from said link in a sequence of time slots corresponding to said defined service sequence, the data in any one slot being derived from its associated constituent stream and in the form of codewords from said codeword set, said stream having terminator codewords marking the ends of at lease some slots.

11. Apparatus as claimed in claim 10 wherein the data in at least one of said constituent streams includes both data characters and terminal control data, and wherein a single codeword set is used to encode together said characters and said control data.

12. Apparatus as claimed in claim 10, said codeword set being chosen to reflect the statistics of data frequency, with shorter codewords assigned to more frequent data, thereby reducing required link capacity.

13. Apparatus as claimed in claim 10, wherein each slot in said composite data stream ends in a terminator codeword.

14. Apparatus as claimed in claim 10, wherein said protocol-defining apparatus additionally defines for each member of said service sequence a maximum codeword count, and slots in said composite data stream end in terminator codewords only when containing less than said count.

15. Apparatus as claimed in claim 10, said terminator codeword having a length of at least two bits.

16. Apparatus as claimed in claim 14, wherein the maximum codeword count for at least one member of said service sequence is greater than 1.

* * * * *

UNITED STATES PATENT AND TRADEMARK OFFICE
CERTIFICATE OF CORRECTION

PATENT NO. : 4,160,877
DATED : July 10, 1979
INVENTOR(S) : James E. Vander Mey

It is certified that error appears in the above-identified patent and that said Letters Patent are hereby corrected as shown below:

Column 4, line 20, "Proc. IRE 50" is changed to --Proc. IRE 50--

Column 4, line 46, "shift register 206" is changed to --shift register 204--

Column 4, line 47, "shift register 206" is changed to --shift register 204--

Column 6, line 24, "(1: 0000000000;" is changed to --(1; 0000000000;--

Column 6, lines 31, 32, "and no 10 bit element" is changed to --and no 10-bit element--

Column 8, line 19, "It other" is changed to --In other--

Column 8, line 50, "to the on channel 198" is changed to --to the encoder on channel 198--

UNITED STATES PATENT AND TRADEMARK OFFICE
CERTIFICATE OF CORRECTION

PATENT NO. : 4,160,877

DATED : July 10, 1979

INVENTOR(S) : James E. Vander Mey

It is certified that error appears in the above-identified patent and that said Letters Patent are hereby corrected as shown below:

Column 13, line 4, "from the counter" is changed to --from the count--

Column 13, line 62, "embodiments" is changed to --embodiment--

Column 14, line 59, "decoding and composite" is changed to --decoding the composite--

Signed and Sealed this

Sixth Day of January 1981

[SEAL]

Attest:

SIDNEY A. DIAMOND

Attesting Officer     Commissioner of Patents and Trademarks